(12) United States Patent
Aoyama

(10) Patent No.: US 9,059,621 B2
(45) Date of Patent: Jun. 16, 2015

(54) ELECTRIC ROTATING MACHINE

(71) Applicant: SUZUKI MOTOR CORPORATION, Shizuoka (JP)

(72) Inventor: Masahiro Aoyama, Shizuoka (JP)

(73) Assignee: SUZUKI MOTOR CORPORATION, Shizuoka (JP)

( * ) Notice: Subject to any disclaimer, the term of this patent is extended or adjusted under 35 U.S.C. 154(b) by 27 days.

(21) Appl. No.: 13/654,497

(22) Filed: Oct. 18, 2012

(65) Prior Publication Data

US 2013/0106228 A1    May 2, 2013

(30) Foreign Application Priority Data

Nov. 2, 2011  (JP) ................. 2011-241408

(51) Int. Cl.
*H02K 1/27* (2006.01)
*H02K 21/14* (2006.01)
*H02K 29/03* (2006.01)
*H02K 21/24* (2006.01)
*H02K 1/14* (2006.01)
*H02K 1/16* (2006.01)

(52) U.S. Cl.
CPC .............. *H02K 21/14* (2013.01); *H02K 21/24* (2013.01); *H02K 1/27* (2013.01); *H02K 1/146* (2013.01); *H02K 29/03* (2013.01); *H02K 1/165* (2013.01); *H02K 1/2766* (2013.01); *H02K 2213/03* (2013.01)

(58) Field of Classification Search
CPC ....... H02K 1/27; H02K 1/2766; H02K 1/146; H02K 1/165; H02K 21/24
USPC ............................... 310/156, 216
See application file for complete search history.

(56) References Cited

U.S. PATENT DOCUMENTS

| | | | |
|---|---|---|---|
| 2003/0020354 A1* | 1/2003 | Abel et al. ................. | 310/214 |
| 2007/0257576 A1 | 11/2007 | Adaniya et al. | |
| 2007/0273241 A1* | 11/2007 | Niguchi et al. ............. | 310/259 |
| 2008/0224563 A1* | 9/2008 | Chochoy .................... | 310/254 |

(Continued)

FOREIGN PATENT DOCUMENTS

| | | |
|---|---|---|
| CN | 101416370 A | 4/2009 |
| CN | 101860097 A | 10/2010 |

(Continued)

OTHER PUBLICATIONS

Aoyama, English translation of JP 2011/050216, 2011.*

(Continued)

*Primary Examiner* — Joshua Benitez-Rosario
*Assistant Examiner* — Rashad Johnson
(74) *Attorney, Agent, or Firm* — Rothwell, Figg, Ernst & Manbeck, P.C.

(57) ABSTRACT

The present invention provides an electric rotating machine capable of providing a high quality and efficient machine operation with reduced oscillation and noise by lowering torque ripple. The electric rotating machine includes a stator having a plurality of teeth facing a rotor, and a plurality of slots providing spaces for winding coils around the teeth. The rotor has a pair of permanent magnets embedded therein and located in a "V" shape configuration so as to let magnetic force act on the teeth such that the rotor within said stator is driven to revolve by reluctance torque and magnet torque. An outer diameter ratio Δ of an outer diameter Dr of the rotor to an outer diameter Ds of the stator falls in a range from 0.61 to 0.645.

4 Claims, 10 Drawing Sheets

(56) References Cited

U.S. PATENT DOCUMENTS

| | | | |
|---|---|---|---|
| 2009/0261679 A1* | 10/2009 | Sakai et al. | 310/156.53 |
| 2010/0295390 A1 | 11/2010 | Rau et al. | |
| 2011/0018384 A1* | 1/2011 | Kenjo et al. | 310/216.092 |
| 2011/0085926 A1 | 4/2011 | Jung et al. | |

FOREIGN PATENT DOCUMENTS

| | | | |
|---|---|---|---|
| CN | 101911433 A | 12/2010 | |
| JP | 2000-197292 A | 7/2000 | |
| JP | 2006-304546 A | 11/2006 | |
| JP | 2007-312591 A | 11/2007 | |
| JP | 2008-99418 A | 4/2008 | |
| JP | 2011050216 A | * 3/2011 | |

OTHER PUBLICATIONS

Office Action mailed Aug. 4, 2014 in corresponding Chinese Patent Application No. 201210429683.3 (with an English translation) (16 pages).

Office Action mailed Nov. 15, 2014 in corresponding Chinese Patent Application No. 201210429683.3 (with an English translation) (14 pages).

The Third Office Action mailed Jan. 30, 2015 in corresponding Chinese Patent Application No. 201210429683.3 (with an English translation) (15 pages).

* cited by examiner

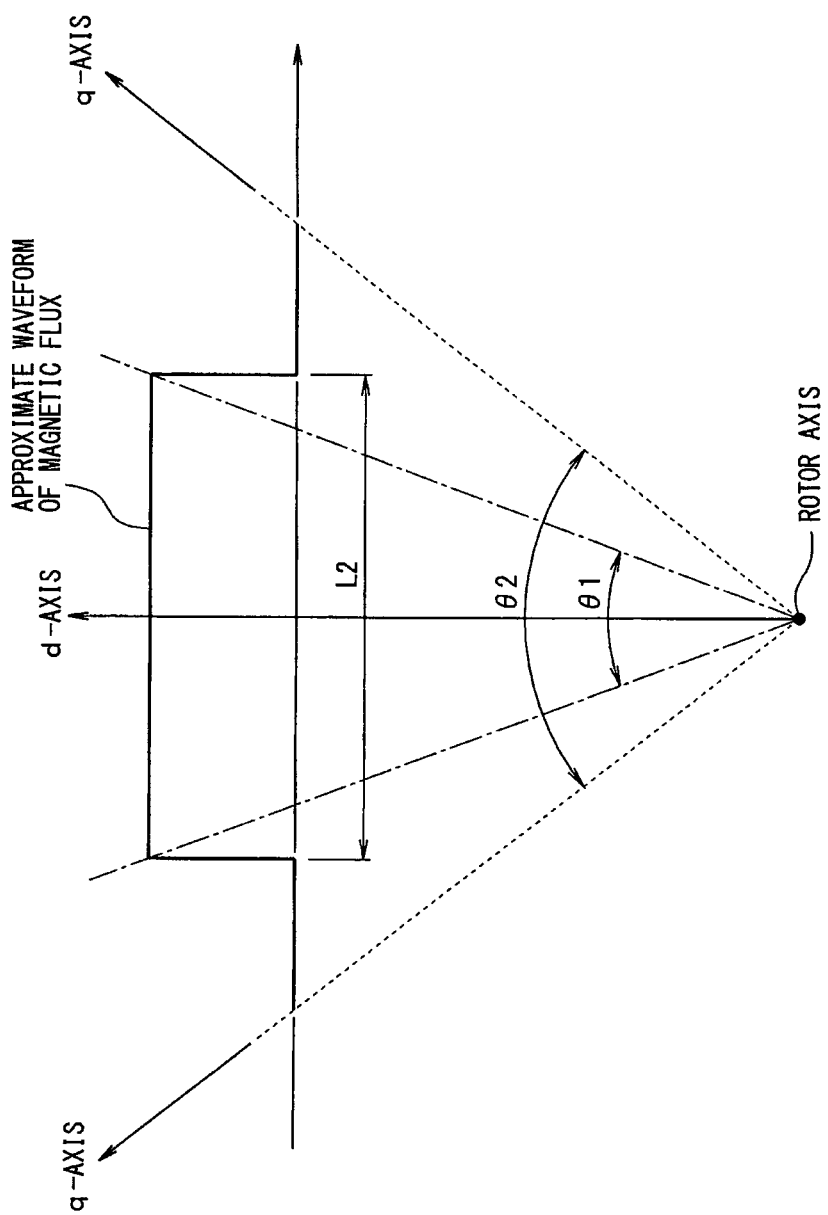

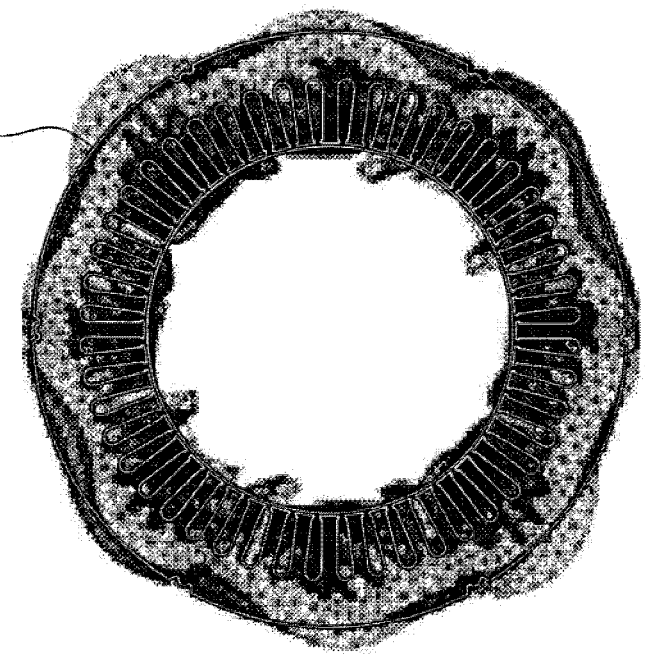
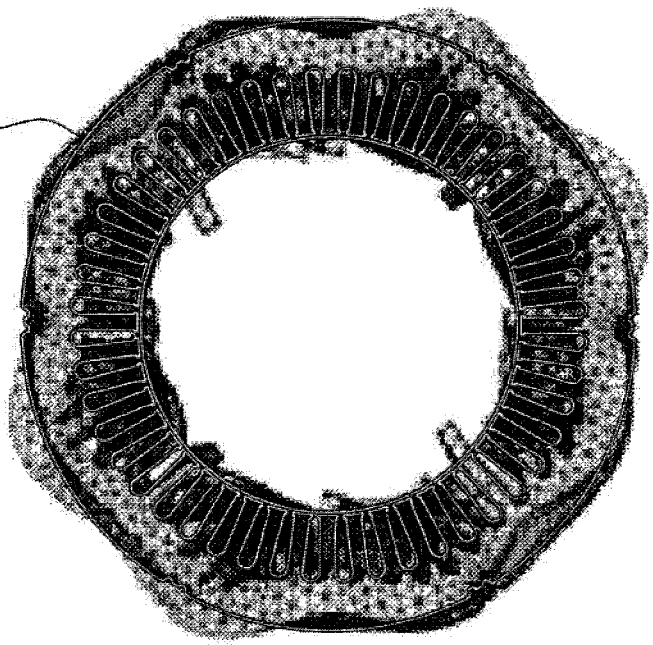
FIG. 6A  T1 (SEC.)
FIG. 6B  T2 (SEC.)
VIBRATION MODE OF THE 2nd ORDER IN ELECTRIC DEGREES
(MODE NUMBER : k = 8)

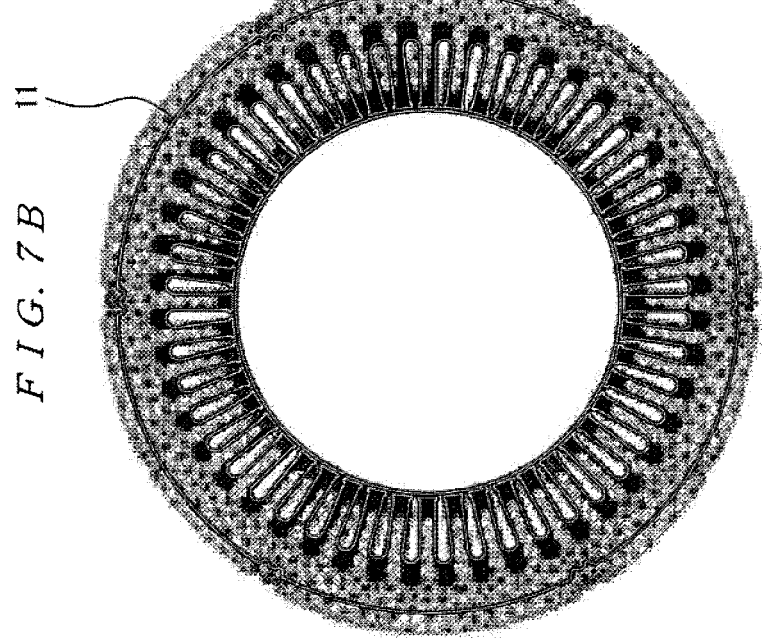
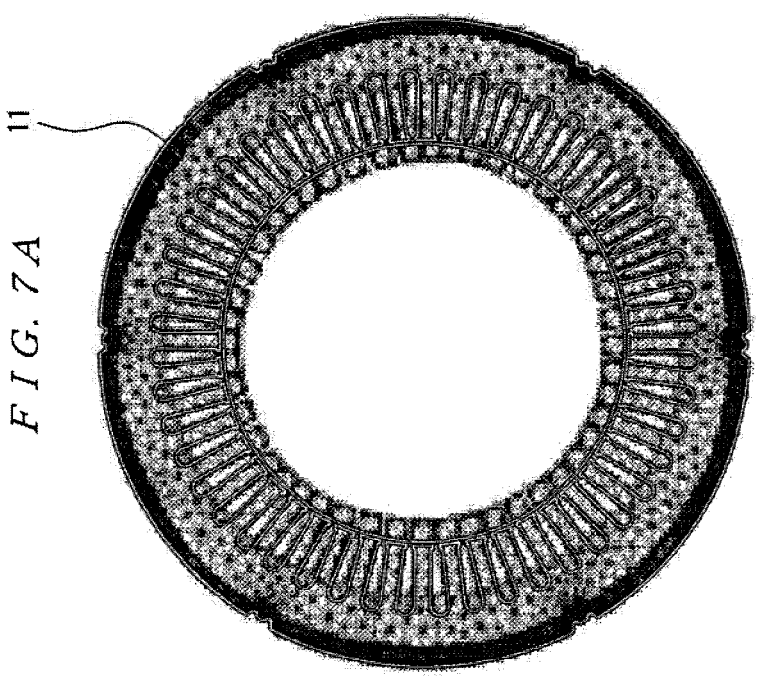
FIG. 7A  T1 (SEC.) (CONTRACTION MODE)
FIG. 7B  T2 (SEC.) (EXPANSION MODE)
VIBRATION MODE OF THE 6th ORDER IN ELECTRIC DEGREES
(MODE NUMBER : k = 0)

000000# ELECTRIC ROTATING MACHINE

RELATED APPLICATION

The present application claims priority to Japanese Patent Application No. 2011-241408 filed on Nov. 2, 2011, the entire content of which is being incorporated herein by reference.

TECHNICAL FIELD

The present invention relates to an electric rotating machine and more particularly to a permanent magnet electric machine capable of acting as an electric motor providing high quality drive.

BACKGROUND ART

Electric rotating machines are required to have varying characteristics with different types of equipment in which they are used. For example, it is required that an electrical machine acts as a variable speed motor over a wide range as well as a high torque motor for low revolution speed operation when it is used, as a traction motor, in a hybrid electric vehicle (HEV) with an internal combustion engine or an electric vehicle (EV) as a driving source.

It is proposed for an electric machine with such characteristics to construct by adopting an interior permanent magnet (IPM) structure in which a plurality of pairs of permanent magnets are embedded in a rotor in a way that the magnets of each pair are located in a "V" shape configuration opening toward the rotor periphery because it is advantageous to use a structure that can effectively utilize reluctance torque together with magnetic torque, see e.g. patent literature 1.

In an electric rotating machine with such IPM structure, a plurality of pairs of permanent magnets are embedded in a rotor in a way that the permanent magnets of each pair are located in a "V" shape configuration to keep q-axis magnetic paths in order to effectively utilize reluctance torque. This increases the proportion of reluctance torque to magnetic torque and also saliency ratio (Ld/Lq), a ratio between inductance in d-axis and inductance in q-axis, resulting in increased tendency of space harmonics of the higher order to overlap flux waveform. The d-axis is aligned with a direction of flux generated by magnetic poles and acts as a center axis between each pair of permanent magnets located in "V" shape, while the q-axis is at an angle of 90 in electric degrees from the d-axis electrically and magnetically and acts as a center axis between the adjacent magnetic poles (i.e., the adjacent pairs of permanent magnets).

This causes high torque ripple, i.e., the difference between maximum and minimum torque during one revolution, in such electric rotating machine. The high torque ripple causes an increase in oscillation of the machine and electromagnetic noise. Especially, electromagnetic noise is desired to be reduced as much as possible because it gives an unpleasant sound to occupant(s) in a vehicle having, as an electric drive, the electric machine due to a relatively high frequency of the electromagnetic noise to that of noise generated by drive of an internal combustion engine.

On the other hand, highly efficient drive by the electric rotating machine is demanded to generate a desired driving force efficiently with less consumption of electricity but oscillation becomes loss to cause a reduction in the efficiency.

Following not only restrictions of loading space, but also recent demands of improvement in energy conversion efficiency (mileage) in hybrid and electric cars, there is a growing demand of lightweight and miniaturization in electric rotating machines capable of providing high energy density output. Reducing torque ripple is effective to control judder, abnormal vibrations, and to provide smooth acceleration performance because, for example, there is a need to provide highly efficient drive over a usually used range for driving a car in street use.

It is very difficult to combine miniaturization as stand-alone units with improved efficiency, reduced electromagnetic noise and low torque ripple because, in electric rotating machines (motors), there are a tendency of increase in electromagnetic noise and a tendency of decrease in efficiency caused due to occurrence of torque ripple in accordance with an increase in output density per unit volume, but the demand of lightweight and miniaturization is growing.

In order to realize low electromagnetic noise and low torque ripple, it is proposed to axially divide a rotor to allow one of the adjacent pairs of permanent magnets to assume an angularly twisted positional relation with the other or give a skew angle (see, for example, patent literature 2).

The above-mentioned measure to give a skew angle in an electric rotating machine causes not only an increase in assembly cost and thus an increase in production cost, but also a difference at interfaces of the adjacent pairs of permanent magnets and a deterioration of the rate of magnetization at the interfaces, causing the permanent magnets to lower their magnetic flux density. As a result, the output torque to be produced by the electric rotating machine drops.

This is why various different ideas from the measure to give a skew angle are proposed to realize low electromagnetic noise and low torque ripple. They include an approach to modify an air gap between a rotor and a stator surrounding the rotor in such a way that an air-gap length at a position where every p-axis intersects the air-gap is greater than air-gap lengths at the other positions by, for example, modifying the shape of the rotor periphery in such a way that the rotor periphery has a bulged shape at every magnetic pole like a "petal" shape (see, for example, patent literatures 1, 3 and 4).

In electric rotating machines described in patent literatures 1, 3 and 4, an inductance at every p-axis increases because an air gap is wide, causing not only a drop in saliency ratio and a drop in torque, but also a decrease in machine efficiency.

PRIOR ART DOCUMENT

Patent Literature

Patent Literature 1: JP patent application laid-open publication No. 2008-99418 (P2008-99418A)
Patent Literature 2: JP patent application laid-open publication No. 2006-304546 (P2006-304546A)
Patent Literature 3: JP patent application laid-open publication No. 2000-197292 (P2000-197292A)
Patent Literature 4: JP patent application laid-open publication No. 2007-312591 (P2007-312591A)

SUMMARY OF THE INVENTION

Thus, an object of the present invention is to provide an electric rotating machine capable of providing a high quality and efficient machine operation with reduced oscillation and noise by lowering torque ripple.

According to a first aspect of the present invention, there is provided an electric rotating machine comprising a rotor with a rotor shaft located on a rotor axis and a stator rotatably receiving the rotor, wherein said stator includes a plurality of teeth, which extend towards a peripheral surface of said rotor and terminate at inner peripheral surfaces facing the peripheral surface of said rotor, and a plurality of slots, each between the adjacent two of the teeth, providing spaces for winding coils around said teeth for input of driving electric power, wherein said rotor has a plurality of permanent magnets embedded therein so as to let magnetic force act on that surface portions of the teeth which are opposed to the permanent magnets, wherein said rotor within said stator is driven to revolve by reluctance torque derived from magnetic flux passing through said teeth, rear surface side of the teeth and said rotor when current passes through said coils and magnet torque in the form of attraction and repulsion derived from interference with said permanent magnets, wherein an outer diameter ratio of an outer diameter Dr of said rotor to an outer diameter Ds of said stator falls in a range effective for minimizing torque ripple.

According to a second aspect of the present invention, in addition to the specified matter by the first aspect, when a set of permanent magnets of said plurality of permanent magnets corresponds to a set of slots of said plurality of slots and forms a magnet pole and said set of slots includes six, in number, slots, said outer diameter ratio Dr/Ds falls in the range expressed as:

$0.61 \leq Dr/Ds \leq 0.645$.

According to a third aspect of the present invention, in addition to the specified matter by one of the first and second aspects, the electric rotating machine is configured to satisfy condition expressed as $Lt/Dr \leq 0.04$ $2Lt \leq Lb$ $0.35 \leq d/Ls \leq 0.44$ $0.32 \leq Ls/Lt$ where: Lt is the thickness of each of said plurality of teeth, Lb is the thickness of the rear surface side of each of said plurality of teeth, d is the diameter of conductor of said coils, and Ls is the width of opening of each of said plurality of slots.

The magnet pole may be formed by permanent magnets of each pair embedded in the rotor and located in a "V" shape configuration opening toward the rotor periphery.

According to the first aspect of the present invention, the rotor and the stator satisfy that the outer diameter ratio of the outer diameter Dr of the rotor to the outer diameter Ds of the stator which falls in the range effective to minimize torque ripple. As a result, a high quality machine operation with reduced vibration and noise is provided and at the same time a highly efficient machine operation with reduced losses is provided because the torque ripple is reduced.

According to the second aspect of the present invention, the outer diameter ratio falls in the range from 0.61 to 0.645 when one magnet pole for the permanent magnets of each set or pair in the rotor corresponds to a set of six, in number, slots. This results in realization of a high quality machine operation with reduced losses in addition to reduced vibration and noise.

According to the third aspect of the present invention, coils can be formed by automatically binding windings in each slot between the adjacent teeth using an automatic binding machine in addition to reduction of iron loss because the condition (the thickness of each stator tooth Lt)/(the outer diameter of rotor Dr)≤0.04, (2Lt)≤(the thickness of rear surface side of each stator tooth Lb), 0.35≤(the diameter of coil conductor d)/(the width of opening of each slot Ls)≤0.44 and 0.32≤(the width of opening of each slot Ls)/(the thickness of each stator tooth Lt).

BRIEF DESCRIPTION OF THE DRAWINGS

FIG. 5 is a schematic diagram showing the relationship among the approximate waveform of the magnetic flux, the effective magnetic pole opening angle and a magnet opening angle.

FIGS. 6A and 6B are schematic diagrams illustrating an oscillation or vibration mode generated in the stator.

FIGS. 7A and 7B are schematic diagrams illustrating another oscillation or vibration mode in the stator different from the vibration mode of FIGS. 6A and 6B.

DESCRIPTION OF IMPLEMENTATION(S)

Referring to the accompanying drawings, implementations of the present invention are specifically explained below. FIGS. 1 through 10 show one implementation of an electric rotating machine according to the present invention.

Figure 1:
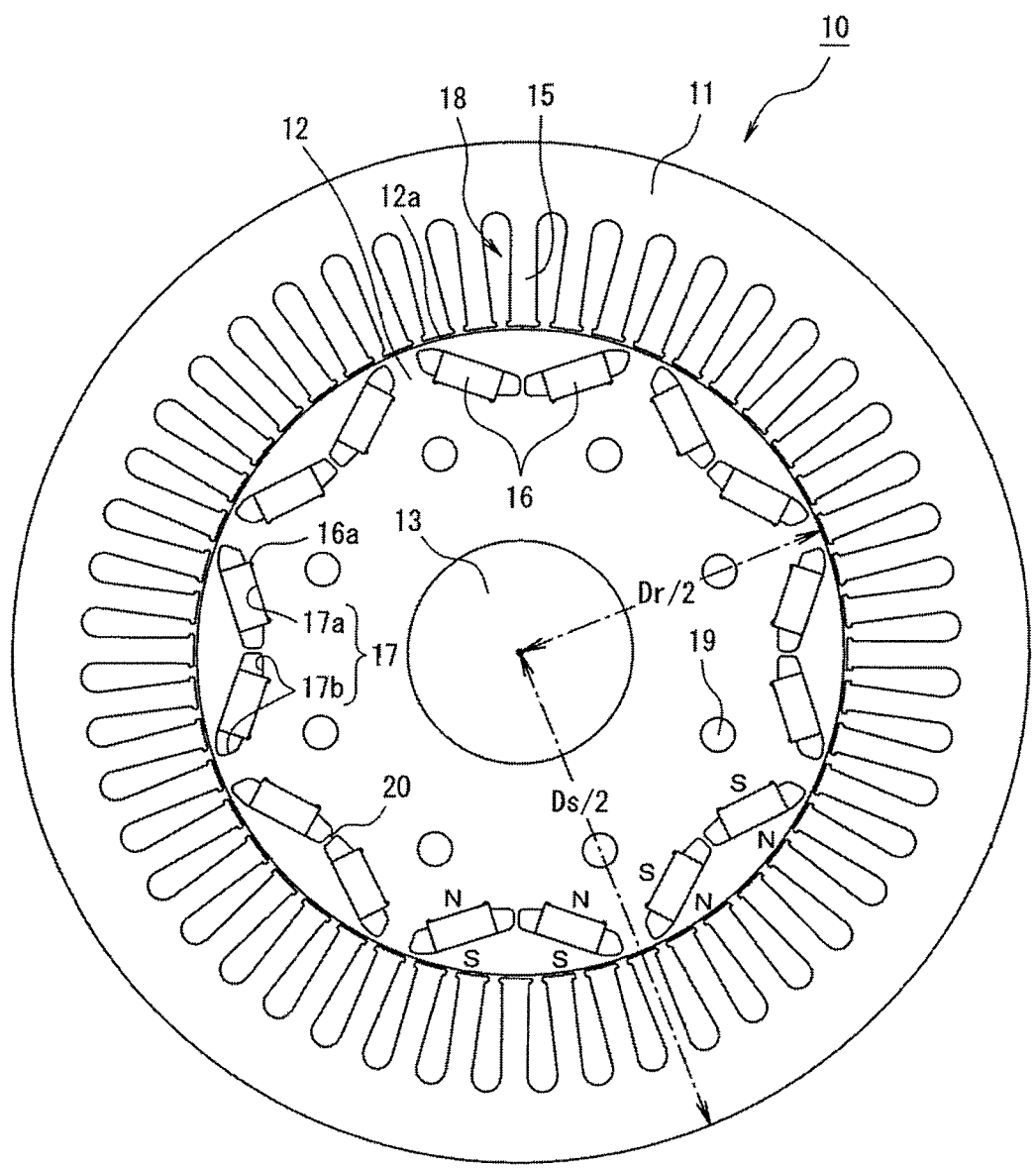
FIG. 1 is a plan view showing one implementation of an electric rotating machine according to the present invention, showing the outline of its overall structure.
Figure 2:
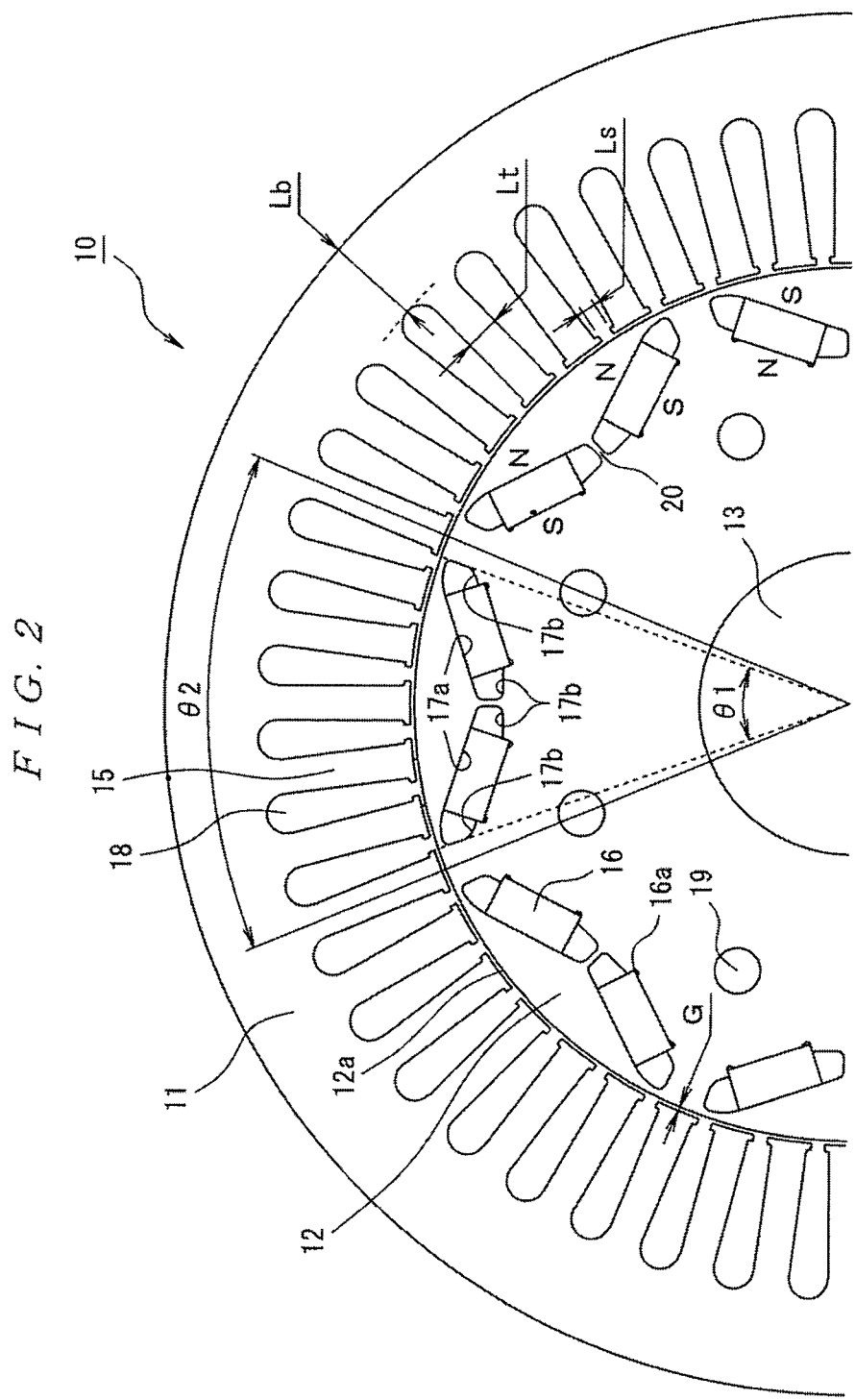
FIG. 2 is a fragmentary plan view showing an effective magnetic pole opening angle for a magnetic pole in the machine.

Referring to FIGS. 1 and 2, an electric rotating machine (motor) 10 has a good performance for use in, for example, a hybrid electric car or electric car as a driving source in a manner similar to an internal combustion engine or as an in-wheel drive unit, and it includes a stator 11 formed in a cylindrical configuration and a rotor 12 rotatably received in the stator 11 with a rotor shaft 13 in a way that the rotor 12 is located on a rotor axis that is common to an axis for the stator 11.

With an air gap G between the stator 11 and the rotor 12, the stator 11 includes slots 18 extending toward the rotor axis throughout an inner circular margin, and a plurality of stator teeth 15 defined by the slots 18. The stator teeth 15 extend in radial directions toward the rotor axis with their ends facing an outer circular periphery surface 12a of the rotor 12 with the air gap G between them. The stator teeth 15 are wound to provide a three-phase distributed winding (not shown) to form coil windings configured to induce flux patterns for creation of rotor torque imparted to the rotor 12.

The rotor 12 is an interior permanent magnet (IPM) rotor which has embedded therein a plurality of sets (pairs in this example) of permanent magnets 16 in a way that magnets of each set include a pair of permanent magnets 16 located in a "V" shape configuration opening toward its outer circular periphery surface 12a. The rotor 12 is formed with a plurality of pairs of bores 17 which are located in a "V" shape configuration opening toward the outer circular periphery surface 12a and extend axially through the rotor 12. The bores 17 of each pair include a pair of bore sections 17a in which the permanent magnets 16 of each pair, which are tabular magnets, are accommodated and kept immobile with their corner portions 16a each inserted into and held in a face-to-face relationship to the adjacent two angled inner walls defining the corresponding bore section 17a. Each of the bores 17 includes two space sections 17b that are located on the opposite sides of the corresponding tabular magnet 16 and spaced in a width direction of the magnet 16 to function as flux barriers for restricting sneak flux (called hereinafter "flux barriers"). The bores 17 of each pair are provided with a center bridge 20 interconnecting the permanent magnets 16 of the associated pair in order to retain the permanent magnets 16 in appropriate position against the centrifugal force at high speed revolutions of the rotor 12.

In this electric rotating machine 10, the stator teeth 15 are angularly distant to provide spaces, as the slots 18, to accommodate coil windings, so that six stator teeth 15 cooperate with the corresponding one of eight sets of permanent magnets 16, in other words, six (6) slots 18 face one of eight sets of permanent magnets 16. For this reason, the electric rotating machine 10 is configured to act as an 8-pole 48-slot three-phase IPM motor including eight (8) magnetic poles (four pairs of magnetic poles) for eight (8) sets of permanent magnets 16, in which N-poles and S-poles of the permanent magnets 16 of each set are rotated 180 in mechanical degrees with respect to those of the adjacent set, and forty eight (48) slots 18 accommodating coil windings formed by a single phase distributed winding using six (6) slots 18 defining five (5) stator teeth 15. The illustrated labeling N and S are used for the convenience sake in this explanation, but they are not on the surfaces of the components.

This structure causes the electric rotating machine 10 to drive the rotor 12 and the rotor shaft 13 when the coil windings in the slots 18 are excited so that magnetic flux flow patterns pass from the stator teeth 15 into the rotor 12 inwardly from the outer circular periphery surface 12a because rotor torque is created by, in addition to magnet torque derived from attraction and repulsion by interaction of the magnetic flux flow patterns with flux flow patterns for the magnetic poles for the permanent magnets 16 of each set, reluctance torque tending to minimize magnetic flow paths for the magnetic flux flow patterns from the stator 11.

Figure 3:
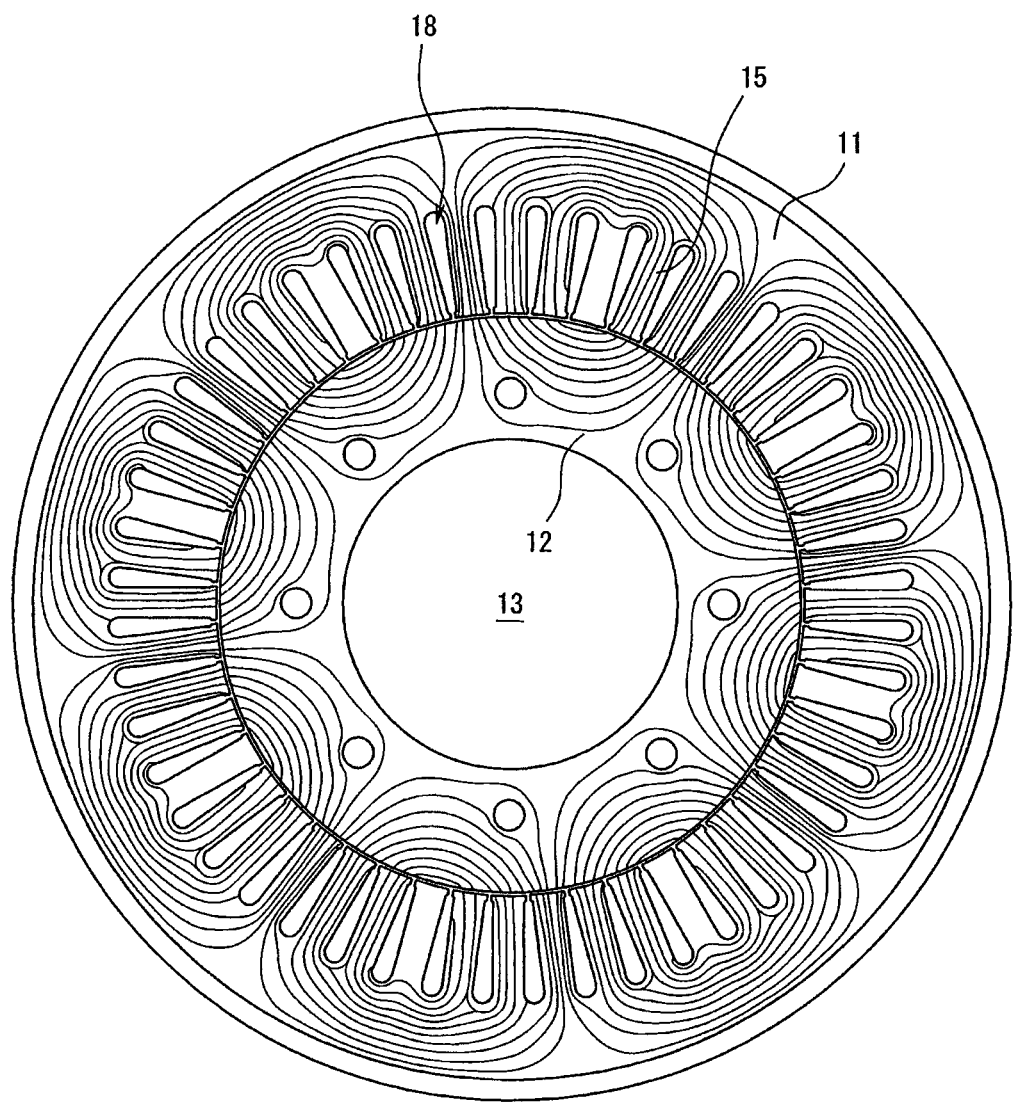
FIG. 3 is a plan view showing magnetic flux flow pattern produced by a stator of the machine when a rotor of the machine has no magnetic poles.

As shown in FIG. 3, the electric rotating machine 10 has the coil windings accommodated in the slots 18 formed by the distributed winding so as to provide a flux flow pattern, which includes distributed magnetic paths, from the stator 11 into the rotor 12 for each of a plurality sets of stator teeth 15 corresponding to one of the magnetic poles for the plurality pairs of permanent magnets 16. The V shape bores 17 of each pair for the permanent magnets 16 extend along the magnetic paths or, in other words, in a manner not to disturb formation of such magnetic paths. It is noted that laminations of magnetic steel such as, silicon steel or the like, are arranged in stacked axial relation to an appropriate thickness for a desired output torque and fastened by fastening screws using tappet holes 19 in a manufacturing process of the stator 11 and the rotor 12.

Figure 4:
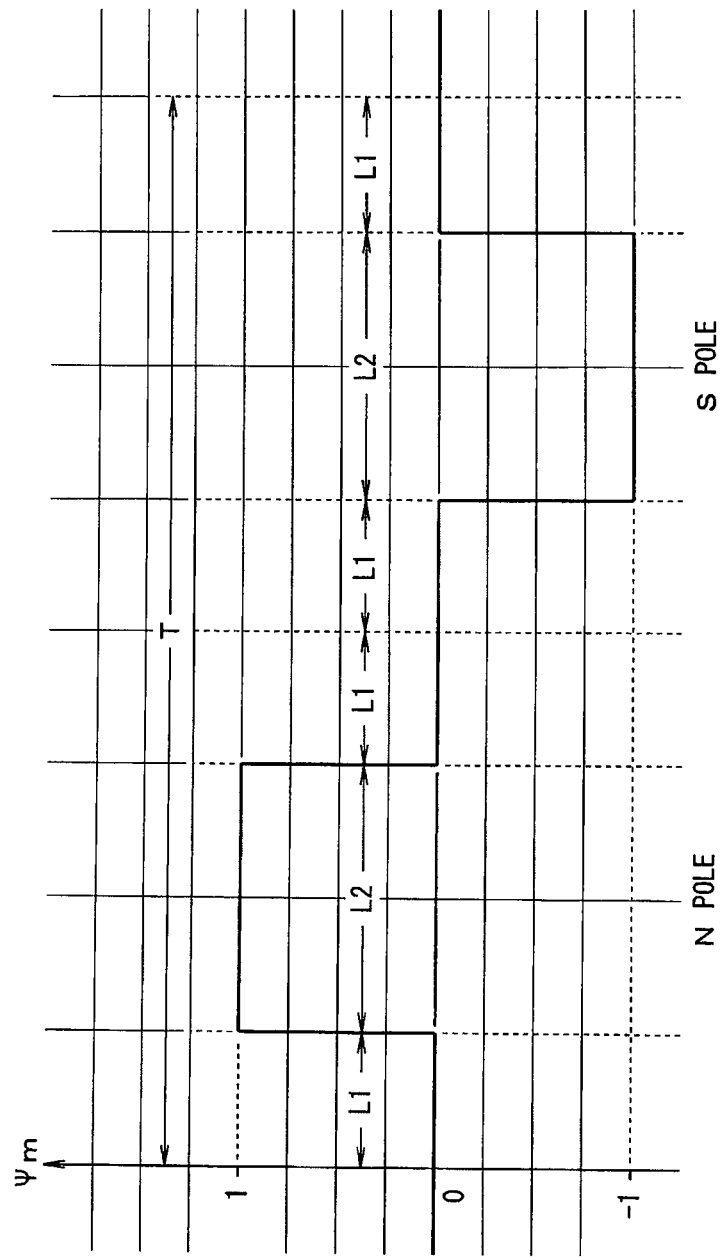
FIG. 4 is a graphical representation of an approximate waveform of the magnetic flux (the fundamental).

Considering now the electric rotating machine 10 employing the IPM structure in which the permanent magnets 16 are embedded in the rotor 12, the variation of the magnetic flux in one tooth of the stator teeth 15 of the stator 11 may be approximated by a square waveform shown in FIG. 4. Superposition of this fundamental magnetic flux wave and space harmonics of the lower order, the fifth ($5^{th}$) and the seventh ($7^{th}$) harmonic, are a factor that affects not only oscillation and noise experienced by the vehicle occupants, but also iron losses and a decrease in machine operating efficiency derived from a loss as thermal energy created by high torque ripple, (i.e., the difference between maximum and minimum torque during one revolution). Suppressing the space harmonics reduces the iron losses to improve machine operating efficiency with respect to input of electrical energy because hysteresis loss is the product of frequency and magnetic flux density and eddy current loss is the product of the square of frequency and magnetic flux density. Turning to FIG. 4 with the vertical axis representing magnetic flux and the horizontal axis representing time, the illustrated square waveform approximates the variation of the magnetic flux in one tooth of the stator teeth 15 over one cycle T (4L1+2L2) in electrical degrees in which no magnetic flux passes through the tooth for a duration L1 and magnetic flux with an amplitude passes forwardly through the tooth for a duration L2 of the first half of the cycle T and reversely through the tooth for the duration L2 of the second half of the cycle T.

Electromagnetic noise from the motor (electric rotating machine) is generated by oscillation of the stator caused by electromagnetic force acting on the stator. As the electromagnetic force acting on the stator, there exist radial electromagnetic force derived from magnetic coupling between the rotor and the stator and angular electromagnetic force derived from torque. Considering radial electromagnetic force acting on each of the stator teeth 15 with a linear magnetic circuit approximating the motor, the radial electromagnetic force fr and magnetic energy W can be expressed in the following formulae (1) and (2) as $$W = \frac{1}{2}\phi^2 R_g = \frac{1}{2}(B \cdot S)^2 \cdot \frac{x}{\mu S} = \frac{1}{2\mu}B^2 \cdot x \cdot S \tag{1}$$

$$fr = \frac{\partial W}{\partial x} = \frac{1}{2\mu}B^2 S \frac{\partial}{\partial x}(x) = \frac{1}{2\mu}B^2 S \tag{2}$$

where φ is the magnetic flux, W is the magnetic energy, fr is the radial electromagnetic force, Rg is the reluctance, B is the magnetic flux density, S is an area through which the magnetic flux passes, x is the air gap (G) length, and ε is the permeability in magnetic path.

Taking space harmonics into account, the flux density B can be expressed as shown in the following formula (3), so it follows that the superposition of the fundamental and the space harmonics is a factor that increases the radial electromagnetic force fr because the radial electromagnetic force fr includes the square of the flux density B. Diligent examination and study by the inventor has proven that reducing the space harmonics lowers torque ripple, resulting in realization of not only a reduction in motor electromagnetic noise, but also an improved machine operating efficiency.

$$B = \sum_{t=1}^{t} Bt \sin t(\theta + \delta t) \tag{3}$$

Inventor's diligent examination and study have also proven that torque ripple in an IPM three-phase motor results from the 6f$^{th}$ (where f=1, 2, 3, . . . : the natural number) harmonic components at θ in electrical degrees, which result from combining, with respect to one phase for one magnetic pole, space harmonics with time harmonics contained in the input phase current supply.

More precisely, three-phase output P(t) and torque τ (t) can be given by the expressions in the following formulae (4) and (5).

$$P(t)=E_u(t)I_u(t)+E_v(t)I_v(t)+E_w(t)I_w(t)=\omega_m \cdot \tau(t) \quad (4)$$

$$\tau(t)=[E_u(t)I_u(t)+E_v(t)I_v(t)+E_w(t)I_w(t)]/\omega_m \quad (5)$$

where $\omega_m$ is the angular velocity; $E_u(t)$, $E_v(t)$ and $E_w(t)$ are the U phase, V phase and W phase induced voltages, respectively; and $I_u(t)$, $I_v(t)$ and $I_w(t)$ are the U phase, V phase and W phase currents, respectively.

Three phase torque is the sum of the U phase, V phase and W phase torques. Assuming that m is the order of harmonic component in the current and n is the order of harmonic component in the voltage, the U phase induced voltage $E_u(t)$ can be written as in the following formula (6) and the U phase current $I_u(t)$ can be written as in the following formula (7), and the U phase torque $\tau_u(t)$ can be given by the expression shown in the following formula (8).

$$E_u(t) = \sum_{n=1}^{n} E_n \sin n \cdot (\theta + \alpha_n) \quad (6)$$

$$I_u(t) = \sum_{m=1}^{m} I_m \sin m \cdot (\theta + \beta_m) \quad (7)$$

$$\tau_u(t) = \quad (8)$$
$$\frac{1}{\omega_m}\left[\sum_{n=1}^{n}\sum_{m=1}^{m} E_m I_m \left\{-\frac{1}{2}(\cos((n+m)\theta + n\alpha_n + m\beta_m) - \cos((n-m)\theta + n\alpha_n - m\beta_m))\right\}\right]$$

It is well known that phase voltage E(t) and phase current I(t) are symmetrical waves, so n and m are odd numbers only. It is further known that the V phase induced voltage $E_v(t)$ and current $I_v(t)$ for the V phase torque and the W phase induced voltage $E_w(t)$ and current $I_w(t)$ for the W phase torque are +2π/3 radians and −2π/3 radians shifted from the U phase induced voltage $E_u(t)$ and current $I_u(t)$ for the U phase torque, respectively. It is seen that, in the expression of the three-phase torque, terms with coefficient 6 only remain and all of the other terms are cancelled each other. It follows that the three-phase torque τ(t) can be written as in the following formula (9).

$$\tau(t) = \frac{1}{\omega_m}\left[\sum_{n=1}^{n}\sum_{m=1}^{m} E_m I_m \left\{-\frac{1}{2}\{3\cos(6f\theta + s) - 3\cos(6f + t)\}\right\}\right] \quad (9)$$

where 6f=n±m (f is the natural number), s=nα$_n$+mβ$_m$, t=nα$_n$−mβ.

It has become clear from the above formula that when the order n of space harmonics contained in the flux (induced voltage) and the order m of time harmonics contained in the phase supply current are combined to give the number 6f, torque ripples of the 6f$^{th}$ order are generated in the three-phase AC motor because, as an induced voltage is known as the time derivative of a magnetic flux, the harmonics contained in the induction voltage for each phase are of the same order as the harmonics contained in one phase one magnetic pole flux of the same phase.

Now, torque ripples are generated in the three-phase motor upon superposition of the fundamental and space harmonics of the order n=5, 7, 11, 13 in sine-approximation method with, for example, only time harmonic of the order m=1 contained in phase current because torque ripples are generated when the order m of space harmonic in magnetic flux waveform of one phase for one magnetic pole and the order n of time harmonic in phase current of the same phase are combined to meet the condition that n±m=6f (f is the natural number).

For a three-phase IPM motor like the electric rotating machine 10 having six (6) slots 18 per each magnetic pole and twelve (12) slots 18 correspond to each pair of magnetic poles, reluctance becomes high in some of all of the slots 18 at circumferentially spaced twelve (12) positions during one cycle in electrical degrees, causing superposition of the fundamental flux waveform and the eleventh (11$^{th}$) and thirteenth (13$^{th}$) space harmonics (n=11, 13).

However, it is difficult to reduce torque ripple components resulted by the fifth (5$^{th}$) and seventh (7$^{th}$) space harmonics (n=5, 7), i.e., harmonics of 6$^{th}$ order because 6f=6, because, as shown in FIG. 4, the flux waveform derived from flux linkage of magnetic field at one of the stator teeth 15 approximates square waveform and thus makes it easy for the 5$^{th}$ and 7$^{th}$ harmonics to superimpose the fundamental flux waveform.

Fourier transform equation f(t) when the flux waveform in one of the stator teeth 15 for the three-phase IPM structure is approximated to a square waveform can be given by the expression in the following formula (10), and the flux waveform F(t) shown in FIG. 4 can given by the expression in the following formula (11). This flux waveform F(t) can be written as the following formula (12), an approximation formula including space harmonics not higher than the 7$^{th}$ harmonic, which in turn can be transformed to the following formula (13) by the arrangement of the terms given after expansion using the sum to product formulae in trigonometry. This formula (13) makes it clear that satisfying the following condition 1 or 2 is needed for reduction of the 5$^{th}$ or 7$^{th}$ harmonic.

$$\cos 5\omega \cdot L1 = 0 \quad \text{Condition 1}$$

$$\cos 7\omega \cdot L1 = 0 \quad \text{Condition 2}$$

$$f(t) = \frac{4}{\pi}\sum_{k=1}^{\infty}\frac{\sin\{(2k-1)\omega t\}}{2k-1} \quad (10)$$

$$f(t) = \frac{1}{2}[f(t-\alpha) + f(t+\alpha)] \quad (11)$$

$$= \frac{1}{2}\left[\frac{4}{\pi}\sum_{k=1}^{\infty}\frac{\sin\{(2k-1)\omega(t-\alpha)\}}{2k-1} + \frac{4}{\pi}\sum_{k=1}^{\infty}\frac{\sin\{(2k-1)\omega(t+\alpha)\}}{2k-1}\right]$$

$$F(t) = \frac{1}{2}\left[\frac{4}{\pi}\left\{\sin\omega(t-\alpha) + \frac{1}{3}\sin 3\omega(t-\alpha) + \frac{1}{5}\sin 5\omega(t-\alpha) + \frac{1}{7}\sin 7\omega(t-\alpha)\right\} + \frac{4}{\pi}\left\{\sin\omega(t+\alpha) + \frac{1}{3}\sin 3\omega(t+\alpha) + \frac{1}{5}\sin 5\omega(t+\alpha) + \frac{1}{7}\sin 7\omega(t+\alpha)\right\}\right] \quad (12)$$

-continued $$F(t) = \frac{4}{\pi}\left[\sin\omega t \cdot \cos\omega\alpha + \frac{1}{3}\sin 3\omega t \cdot \cos\omega\alpha + \frac{1}{5}\sin 5\omega t \cdot \cos 5\omega\alpha + \frac{1}{7}\sin 7\omega t \cdot \cos 7\omega\alpha\right] \quad (13)$$

Referring to the flux waveform shown in FIG. 4, its behavior can be expressed as the following formula (14) Substituting this formula into the relationship (i.e., $5\omega \cdot L1 = \pm \pi/2$) derived from the condition 1 gives the expression in the following formula (15), called "condition 1 as modified". Rewriting this expression using the fact that L1, L2>0 can give the expression in the following condition 1A. It is noted that the condition 1A provides reduction of torque ripple by lowering the $5^{th}$ space harmonic to zero when it is satisfied.

Angular frequency(angular velocity)$\omega=2\pi/T=2\pi/(4L1+2L2)$  (14)

Condition 1 as modified: $5\omega \cdot L1 = 5 \cdot 2\pi L1/(4L1+2L2) = \pm\pi/2$  (15)

$L1 = L2/8$   Condition 1A

Similarly, condition 2 as modified can be written as the following formula (16). Rewriting this expression using the fact that L1, L2>0 can give the expression in the following condition 2A. It is noted that the condition 2A provides reduction of torque ripple by lowering the $7^{th}$ space harmonic to zero when it is satisfied.

Condition 2 as modified: $7\omega \cdot L1 = 7 \cdot 2\pi L1/(4L1+2L2) = \pm\pi/2$  (16)

$L1 = L2/12$   Condition 2A

For the 8-pole 48-slot electric rotating machine 10, the periphery speed V of the rotor 12 is expressed, using the following relationship that holds in the machine 10, in the following formula (17) which is rewritten as the following formula (18), where r is the radius of the rotor 12.

45 in mechanical degrees=T/2 cycle in electric degrees $$V(m/sec) = 2\pi r \cdot (45°/360°)/(T/2) \quad (17)$$
$$= 2\pi r \cdot (45°/360°)/\{(4L1+2L2)/2\}$$
$$= r(m) \cdot \omega(rad/sec)$$

$$2L1 + L2 = \pi/4\omega \quad (18)$$

Substituting the condition 1A and the condition 2A in the above-mentioned formula (18) gives the following conditions.

The $5^{th}$ space harmonic=0→$(L2,L1)=(\pi/5\omega,\pi/40\omega)$

The $7^{th}$ space harmonic=0→$(L2,L1)=(3\pi/14\omega,\pi/56\omega)$

This increases tendency to reduce the $5^{th}$ and $7^{th}$ space harmonics in the electric rotating machine 10 to restrain torque ripple from increasing by providing a layout that satisfies the following chained notation of inequalities (19)

$\pi/5\omega \leq L2 \leq 3\pi/14\omega$(sec)  (19)

Here, the term L2 in, the chained notation of inequalities (19) represents that area on the side of the rotor 12 facing the stator teeth 15 which provides a magnetic path for the magnetic flux having the flux waveform shown in FIG. 4, and thus it may be interpreted as an arc in the air gap G interconnecting those two lines diverging from the rotor axis (the vertex) and passing through the flux barriers 17b of both sides of a given pair of permanent magnets 16 which form a divergence angle θ1, called "the effective magnetic pole opening angle θ1".

Referring to the flux waveform shown in FIG. 4, the effective magnetic pole opening angle θ1 can be written as θ1=ωL2 because the relationship that θ=ωt holds, so the chained notation of inequities (19) can be written as various expressions as follows. In the case of the configuration of the 8-pole 48-slot electric rotating machine 10 (the configuration in which six (6) slots correspond to or face eight (8) magnetic poles one after another), for example, one cycle of the rotor 12 over 360 in mechanical degrees corresponds to four cycles in electric degrees because each of four pairs of eight (8) magnetic poles experiences one cycle. The various expressions are:

$\pi/5$(rad)≤θ1(in mechanical degrees)≤$3\pi/14$(rad), and

36(degrees)≤θ1(in mechanical degrees)≤270/7(degrees).

Since θ1(in mechanical degrees)=(8 poles/2 poles)·θ1 (in electric degrees),

144(degrees)≤θ1(in electric degrees)≤154.3(degrees).

As shown in FIG. 5, this leads to layout, per one magnet pole in the electric rotating machine 10, of the permanent magnets 16 with their flux barriers 17b at one and the opposite edges within an area bounded by those two lines diverging from the rotor axis (the vertex) which form the effective magnetic pole opening angle θ1, which falls in a range expressed as follows 36°≤θ1(in mechanical degrees)≤38.6°  (20)

or

144°≤θ1(in electric degrees)≤154.3°  (21)

In the IPM structure in which the permanent magnets 16 of each pair, embedded in the rotor 12, are located in a "V" shape configuration, a d-axis represents a direction of magnetic flux generated by magnetic poles, that is, a center axis between each pair of permanent magnets 16 located in "V" shape, while a g-axis represents an axis that is at an angle of 90 in electric degrees from the d-axis electrically and magnetically and acts as a center axis between the permanent magnets 16 of the adjacent magnetic poles. In this situation, the effective magnetic pole opening angle θ1 per magnetic pole in the rotor 12 corresponds to the duration L2 that the magnetic flux passing through the stator teeth 15 continues as readily seen from the waveform approximating the magnetic flux waveform shown in FIG. 4. As shown in FIG. 5, the magnetic flux waveform has its duration L2 located at the midpoint between the q-axes of each pair forming an angle θ2 so that the d-axis passes through the midpoint of the duration L2. The illustrated angle θ2 of FIG. 2 is an angle formed by the q-axes of each pair and 45° in mechanical degrees, and an angle in electric degrees corresponding to half the cycle in the magnetic flux waveform.

Accordingly, with the effective magnetic pole opening angle θ1 that covers not only the permanent magnets 16 of each pair but also their flux barriers 17b in the rotor 12, falling in the range {144°≤θ1 (in electric degrees)≤154.3°} which is effective for torque ripple reduction by suppressing the $5^{th}$ and $7^{th}$ space harmonics, n=5, 7, in the phase voltage, each of which cooperates with the time harmonic in the phase current of the order m=1 to satisfy the specific order of the $6f^{th}$ (n=5, 7), the electric rotating machine 10 is enabled to drive its rotor shaft 13 with the high quality rotation of reduced torque ripple, oscillation and noise. Besides, it is enabled to drive the rotor shaft 13 with the high efficient rotation of reduced losses because the reduced torque ripple reduces oscillation to suppress not only heat loss, but also hysteresis and iron loss.

For investigating a three phase IPM motor which the electric rotating machine 10 adopts as its fundamental structure, vibration analysis of the stator 11 (stator iron core) has been made. This analysis has clarified that the vibration mode shape of a revolving octagon (mode number k=8) is generated by the $2^{nd}$, $4^{th}$, $8^{th}$, $10^{th}$ orders of the radial electromagnetic force fr, see formula (2), which are generated due to the superposition of the fundamental wave (t=1), $3^{rd}$ space component (t=3), $5^{th}$ space component (t=5) as expressed in the before-mentioned formula (3), and the vibration mode shape of a perfect circle having cyclic expansion and contraction (mode number k=0) is generated by the $6^{th}$, $12^{th}$ orders of the radial electromagnetic force fr. For example, in the vibration mode generated by the $2^{nd}$ harmonic (or the $2^{hd}$ order of the radial electromagnetic force fr) shown at two different timings T1 and T2 in FIG. 6A and FIG. 6B, the octagon that is transformed by the vibration of stator 11 revolves, and in the oscillation mode generated by $6^{th}$ harmonic (or the $6^{th}$ order of the radial electromagnetic force fr) shown at two different states of timings T1 and T2 in FIG. 7A and FIG. 7B, the stator 11 cyclically expands and contracts. Furthermore, in the vibration mode generated by the $10^{th}$ order of the radial electromagnetic force fr, not illustrated, the vibration mode shape of an oval is combined with the vibration mode shape of an octagon (mode number k=8).

In the electric rotating machine 10 in the form of an 8-pole 48-slot motor, the magnetic flux density is distributed so that eight (8) magnetic fluxes are positioned one after another in angular direction with respect to one revolution through 360 in mechanical degrees and the eight (8) radial electromagnetic forces fr are positioned one after another in angular direction, so that the eight angularly positioned radial electromagnetic forces fr induce the vibration mode with its mode number k=8. Furthermore, in the vibration mode generated by the $6^{th}$, $12^{th}$ order radial electromotive force fr, the stator 11 is vibrated by an electromagnetic force composite vector that is the sum of an electromagnetic force vector due to torque ripple and an electromagnetic force radial vector due to the magnetic coupling with the stator 11. Thus, during the vibration mode k=0, in which expansion and contraction alternately occur, generated by the $6f^{th}$ order accompanied by torque ripple, that is, the $6^{th}$, $12^{th}$ orders in this example, the circumferential air of the stator 11 propagates the vibration caused by the expansion and contraction, causing an increase in the degree of motor electromagnetic noise of the electric rotating machine 10 as compared to the other orders. For the other orders excluding the above-mentioned $6f^{th}$ order, no torque ripple occurs and no vibration and noise that may create a problem occur.

As a result of this, it is made clear that, in the electric rotating machine 10, suppressing the harmonics of $6^{th}$ order (m=1, n=5, 7) in the magnetic flux waveform, which is considered to create a problem, provides a reduction in torque ripple and judder, suppressing not only abnormal vibration in its installed state in a car, called "judder", but also electromagnetic noise.

In addition to the reduction in torque ripple, not only the structure per one magnetic pole on the rotor 12 but also an outer diameter ratio of the rotor 12 to the stator 11 is adjusted in the electric rotating machine 10 so that the outer diameter ratio falls in a range effective for minimizing torque ripple.

Figure 8:
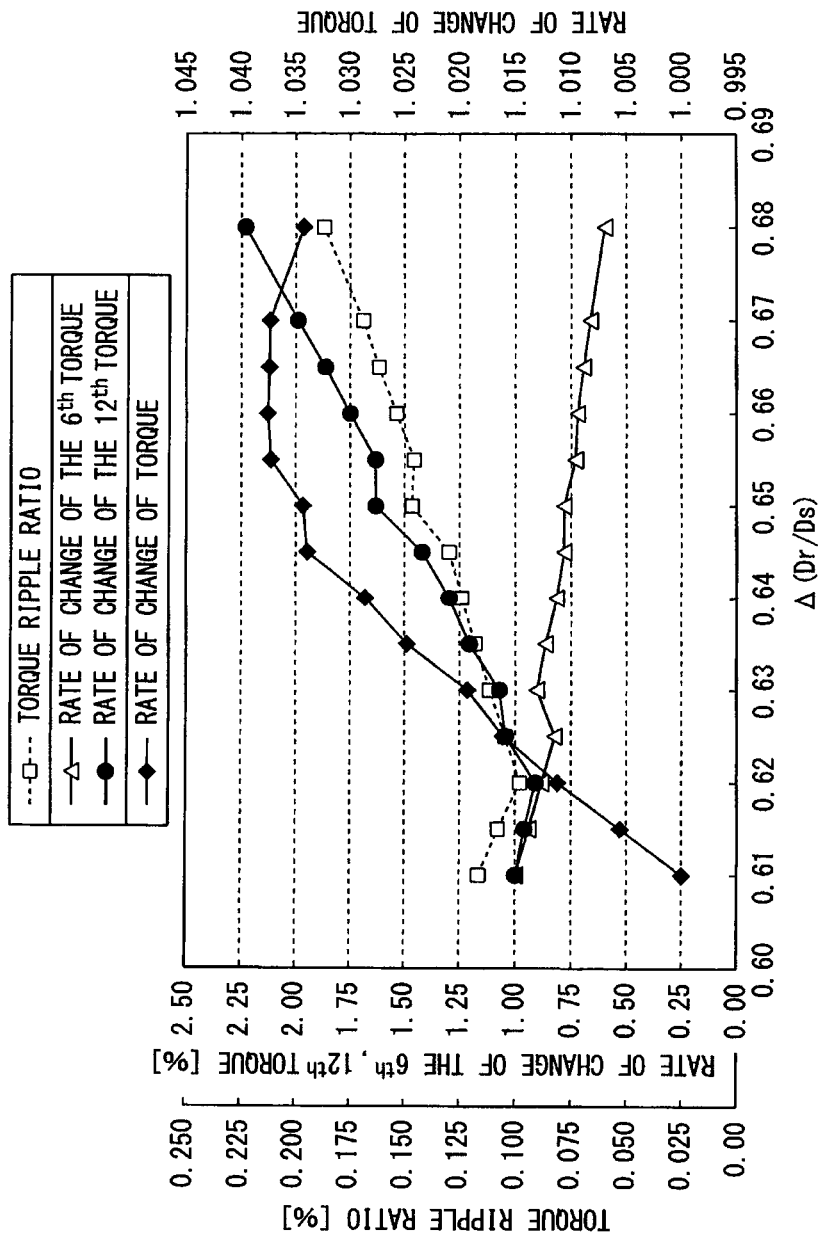
FIG. 8 is a graphical representation showing results of electromagnetic analysis versus the outer diameter ratio of the rotor to the stator as parameter.
Figure 9:
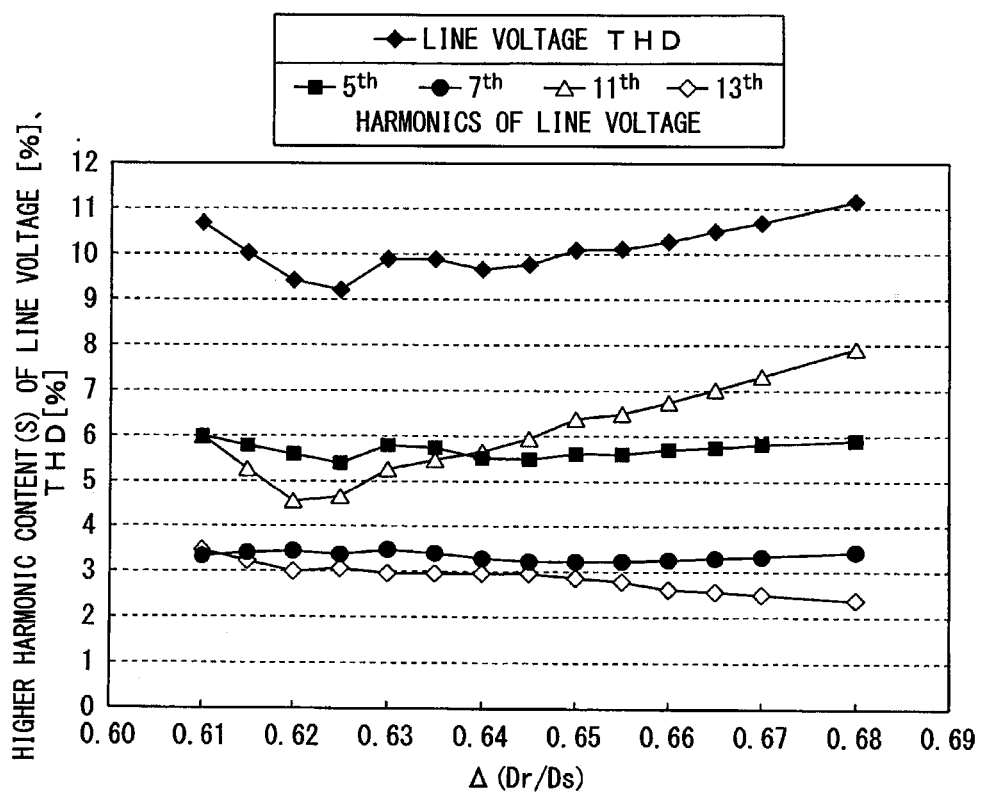
FIG. 9 is a graphical representation showing different results of electromagnetic analysis from those of FIG. 8 versus the outer diameter ratio of the rotor to the stator as parameter.
Figure 10:
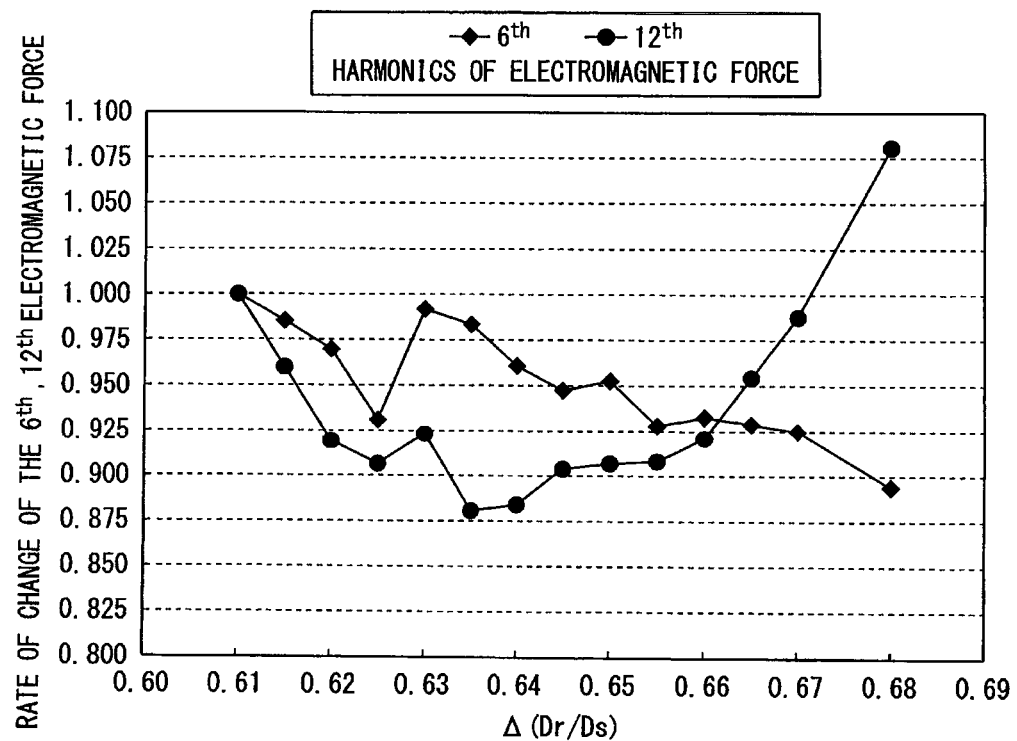
FIG. 10 is a graphical representation showing different results of electromagnetic analysis from those of FIG. 8 or FIG. 9 versus the outer diameter ratio of the rotor to the stator as parameter.

As data shown in FIGS. 8 to 10 clearly show, not only torque ripple but also line voltage THD is reduced when an outer diameter ratio Δ (=Dr/Ds), where: Dr is the outer diameter of the rotor 12 of the electric rotating machine 10, and Ds is the outer diameter of the stator 11, falls in a range expressed as:

$$0.61 \leq \Delta \leq 0.645$$

or preferably $$0.615 \leq \Delta \leq 0.63$$

or more preferably $$0.62 \leq \Delta \leq 0.625.$$

The data in FIGS. 8 to 10 are given by electromagnetic field analysis using finite element method, showing torque and torque ripple caused by the $6^{th}$ and $12^{th}$ order ($6f^{th}$) order harmonics versus the outer diameter ratio Δ as parameter.

FIG. 8 shows not only a torque ripple ratio or an amplitude of torque variation, i.e., a ratio of torque ripple to mean torque {(maximum minimum)/means torque} versus the outer diameter ratio Dr/Ds (Δ) as parameter, but also a rate of change of torque with harmonics in superimposition of the fundamental flux waveform, a rate of change of high harmonic torque of the $6^{th}$ order and a rate of change of high harmonic torque of the $12^{th}$ order with values determined when the outer diameter ratio Δ is 0.61 set as their bases.

As FIG. 8 shows, the torque ripple ratio when the outer diameter ratio Δ=0.61 is equal to that when the outer diameter ratio Δ=0.635 and the torque ripple ratio is lower within a section when the outer diameter ratio Δ ranges from 0.61 to 0.635 than within the other sections. In addition to the lower levels of the torque ripple ratio, a rate of change of the torque ripple ratio is kept low within a section when the outer diameter ratio Δ ranges from 0.615 to 0.63, and it is kept further lower within a section when the outer diameter ratio Δ ranges from 0.62 to 0.625. A suitable range in which the outer diameter ratio Δ should fall may be determined from consideration of the torque ripple ratio and the rates of change of high harmonic torques because, although it is showing a tendency to increase until the outer diameter ratio Δ reaches 0.65, the rate of change of torque has an upper limit of about 0.03 and not so high.

FIG. 9 shows high space harmonic contents of line voltage, including contents of high space harmonics of the order n=5, 7 (caused by the $6^{th}$ harmonic torque) and high space harmonics of the order n=11, 13 (caused by the $12^{th}$ harmonic torque), and line voltage THD (Total Harmonic Distortion) versus the outer diameter ratio Δ as parameter.

As FIG. 9 shows, the high space harmonic content of the $11^{th}$ order changes more significantly than the other high space harmonic contents. The harmonic content when the outer diameter ratio Δ=0.61 is equal to that when the outer diameter ratio Δ=0.645 and it is lower within a section when the outer diameter ratio Δ ranges from 0.61 to 0.645 than within the other sections. Furthermore, the high space harmonic content of the $11^{th}$ order is kept further lower within a section when the outer diameter ratio Δ ranges from 0.615 to 0.63.

FIG. 10 shows a rate of change of the $6^{th}$ harmonic content of electromagnetic force and a rate of change of the $12^{th}$ harmonic content of the electromagnetic force with values determined when the outer diameter ratio Δ is 0.61 set as their bases.

As FIG. 10 shows, each of the harmonic contents of electromagnetic force does not change significantly and shows a tendency to decrease within a section when the outer diameter ratio Δ ranges from 0.61 to 0.66, but the $6^{th}$ harmonic content shows a tendency to increase rapidly when the outer diameter ratio Δ exceeds 0.66.

Based on the above-mentioned trend shown in FIGS. 9 and 10, the outer diameter Ds of the stator 11 and that Dr of the rotor 12 are preferably adjusted so that, as mentioned in the preceding description, the outer diameter ratio Δ (Dr/Ds) falls in a range from 0.61 to 0.645, preferably a range from 0.615 to 0.63 and more preferably a range from 0.62 to 0.625. Without positioning the stator 11 and the rotor 12 to assume an angularly twisted positional relation with each other or so-called giving a skew angle, adjusting the outer diameter ratio Δ of the stator 11 to the rotor 12 to a value falling in the above-mentioned range can reduce not only torque ripple but also line voltage THD even in a usually used range for driving a car in street use after start.

Using the slots 18, the teeth 15 of the stator 11 are wound by winding using an inserter machine to provide a three-phase distributed winding. Reduction of copper loss is aimed at by the setting that a coil-occupancy of each stator slot 18 falls in a range from 75% to 90%, derived from calculation based on the assumption that a rectangle wire is used, under condition that a ratio d/Ls falls in a range from 0.35 to 0.44 when a parallel winding is inserted into each stator slot 18, where d is the diameter of coil conductor and Ls is the width of that opening of each stator slot 18 which faces the rotor 12. In addition to the reduction of copper loss, for reduction of iron loss, the dimensions of various portions of the stator 11 are so determined as to satisfy the conditions expressed as $$Lt/Dr \le 0.04, 2Lt \le Lb, 0.32 \le Ls/Lt$$

where Lt is the thickness of each stator tooth 15; and
Lb is the thickness of the rear side (back york) of each stator tooth 15.

When two parallel windings are inserted into each stator tooth 18, the dimensions are so determined as to satisfy condition that the radio d/Ls falls in a range from 0.29 to 0.32.

According to the present implementation, the torque ripple is reduced to the minimum range because the outer diameter ratio Δ (Dr/Ds) of the outer diameter Dr of the rotor 12 to the outer diameter Ds of the stator 11 falls in the range from 0.61 to 0.645. With automatic binding secured to form coils and reductions of copper and iron loss, efficient operation of the electric rotating machine 10 is accomplished because the thickness Lt of each stator tooth 15, the thickness Lb of the back york on the rear of each stator tooth 15 and the like in the stator 11 are so dimensioned as to satisfy the above-mentioned optimum conditions. As a result, a highly efficient operation of the electric rotating machine 10 with reduced losses is accomplished in addition to a high quality operation of the electric rotating machine 10 with reduced vibration and noise.

In the preceding description of the present implementation, there is explained as one example the structure in which a plurality of pairs of permanent magnets 16 are embedded in a rotor 12 in a way that the magnets of each pair are located in a "V" shape configuration. This present implementation is not limited to this example, but it may be applied to, for example, the arrangement in which permanent magnets are embedded in a rotor 12 in a manner to face the periphery surface 12a to provide the same effects.

During the preceding description of the present implementation, an electric rotating machine 10 in the form of an 8-pole 48-slot motor is taken as an example, but it not limited to this structure. The present invention may find its application in motors including six (6) slots to each magnetic pole, such as, a 6-pole 36-slot, 4-pole 24-slot, 10-pole 60-slot motor, by employing only θ1 in electric degrees in the range of the effective magnetic pole opening angle θ1.

It is not intended to limit the scope of the present invention to the embodiment illustrated and described. It should be appreciated that all of variants accomplishing equivalent effect(s) which are aimed at by the present invention exist within the scope of the present invention. It should be understood that various changes can be made in the function and arrangement of elements without departing from the scope of the present invention as set forth in the appended claims and the legal equivalents thereof.

INDUSTRIAL APPLICABILITY

It should be appreciated that, although one embodiment of the present invention has been described, it is just an example and not intended to limit the scope of the present invention. It should also be appreciated that a vast number of variants exist without departing from the spirit of the present invention.

EXPLANATION OF NOTATIONS 10 electric rotating machine
11 stator
12 rotor
13 rotor shaft
15 stator teeth
16 permanent magnet
16a corner portion
17 bores which are located in a "V" shape
17b flux barrier
18 slot
20 center bridge
Dr diameter of rotor
Ds diameter of stator
Lt thickness of stator tooth
Lb thickness of back york
Ls width of opening of slot
θ1 effective magnetic pole opening angle

The invention claimed is:
1. An electric rotating machine comprising a rotor with a rotor shaft located on a rotor axis and a stator rotatably receiving the rotor,
wherein said stator includes a plurality of teeth, which extend towards a peripheral surface of said rotor and terminate at inner peripheral surfaces facing the peripheral surface of said rotor, and a plurality of slots, each between the adjacent two of the teeth, providing spaces in which a conductor wire is wound to form coils around said teeth for input of driving electric power,
wherein said rotor has a plurality of permanent magnets embedded therein so as to let magnetic force act on that surface portions of the teeth which are opposed to the permanent magnets,
wherein said rotor within said stator is driven to revolve by reluctance torque derived from magnetic flux passing through said teeth, rear surface sides of the teeth and said rotor when current passes through said coils and magnet torque in the form of attraction and repulsion derived from interference with said permanent magnets,
wherein an outer diameter ratio of an outer diameter Dr of said rotor to an outer diameter Ds of said stator falls in a range effective for minimizing torque ripple, wherein the electric rotating machine is configured to satisfy conditions expressed as:

$Lt/Dr \leq 0.04$ $2Lt \leq Lb$ (5)

$0.35 \leq d/Ls \leq 0.44$ $0.32 \leq Ls/Lt$ where: Lt is the thickness of each of said plurality of teeth, Lb is the thickness of the rear surface side of each of said plurality of teeth, d is the diameter of said conductor wire of said coils, and Ls is the width of opening of each of said plurality of slots.

2. The electric rotating machine of claim 1, wherein the plurality of permanent magnets and the plurality of slots form an 8-pole 48-slot motor.

3. The electric rotating machine of claim 2, wherein the motor is a drive source which drives a vehicle.

4. The electric rotating machine of claim 1, wherein the plurality of permanent magnets and the plurality of slots form one of a 6-pole 36-slot motor, a 4-pole 24-slot motor or a 10-pole 60-slot motor.

* * * * *